PETRUS TEN BRUGGEN CATE.
HYDRAULIC PLANT.
APPLICATION FILED SEPT. 25, 1920.

1,396,994.

Patented Nov. 15, 1921.

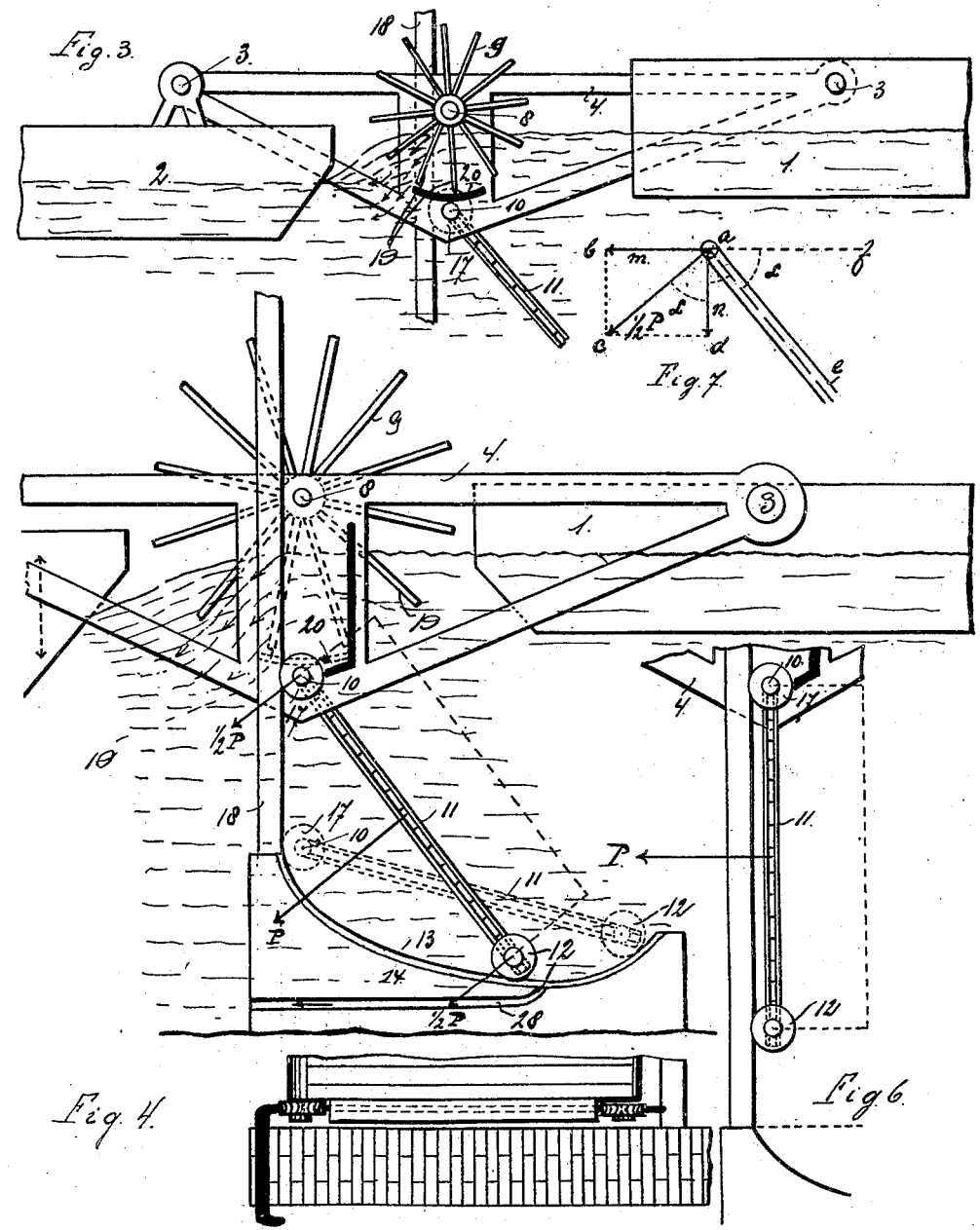

UNITED STATES PATENT OFFICE.

PETRUS TEN BRUGGEN CATE, OF ARNHEM, NETHERLANDS.

HYDRAULIC PLANT.

1,396,994.  Specification of Letters Patent.  Patented Nov. 15, 1921.

Application filed September 25, 1920. Serial No. 412,828.

*To all whom it may concern:*

Be it known that I, PETRUS TEN BRUGGEN CATE, citizen of the Netherlands, residing at Arnhem, Netherlands, have invented certain new and useful Improvements in Hydraulic Plants, (for which I have filed applications in the Netherlands, Sept. 17, 1919; the Netherlands, additional application, Feb. 20, 1920; England, Aug. 20, 1920; Germany, Aug. 20, 1920; France, Sept. 1, 1920,) of which the following is a specification.

The water power of streaming water having only a small drop may be very considerable if the discharged water quantity is very high. In such cases, *i. e.*, with a large discharge and a small fall, water turbines cannot be usefully employed owing to the fact that the length of the supply conduits or canals becomes too long, causing an excessive loss of power by the friction occurring in the supply channels.

It has been proposed to use in such cases floating water wheels which are mounted upon floats adapted to move up and down between walls, but these known arrangements aim only at utilizing the stream velocity of the water and as said velocity is very variable the power produced by such water wheels must naturally also be very variable. Moreover, only a small part of the total available water power may be utilized by such arrangements, as the major part of the water is allowed to flow past the wheel without its energy being used.

It is the object of the present invention to avoid these drawbacks and to utilize practically the whole energy contained in the water as perfectly and efficiently as possible and without preventing navigation.

The improved construction forming the subject of the invention may be used in many cases where the known arrangements for exploiting water power cease to be commercially profitable.

According to the invention the supply level is artifically raised and kept as far as possible at a constant height by opening and closing lock gates, and at the same time a gate pivotally mounted upon a float is constantly maintained by reason of the rise and fall of said float in the desired relation to the level of the tail water.

In this manner a constant hydrostatic pressure is produced, which acts upon the blades or vanes of the water wheel mounted upon the float, and a counter pressure of the tail water upon the blades or vanes is avoided. In this arrangement the stream velocity of the water is of only small importance.

In order to utilize completely the water power the flow of water is controlled by a lock extending over the whole width of the river. In order to enable navigation to take place the water control may be effected either partly or completely by means of locks. A branch canal is used for admitting the supply of water to the respective power motors and the water after giving up the energy contained therein is discharged into the river at a suitable point below the lock. The overflow canal which may also be provided with lock gates is used for regulating the pressure of the water upon the floats and for discharging any excess of water.

The wheel velocity is therefore dependent upon the discharge per unit which may be exactly regulated, and is independent, or practically independent, of the natural stream velocity of the river, in contra-distinction to the present arrangements which are based on the hydro-dynamic exploitation of the water power.

The raising of the water may be carried out to the extent allowed by the height of the river banks. In time of drought the discharge of water may be entirely closed for the purpose of artifically restoring the lowest water level and preventing the drying of the bed, which is a great advantage as far as navigation, fish culture and agriculture are concerned.

The arrangement forming the subject of the invention comprises an undershot water wheel which is provided with a gate which is adapted to turn about a horizontal fulcrum guided in the vertical direction, and which extends close to the lowest point of the wheel. The wheel is mounted upon a frame which is pivotally mounted upon two floats carried by the supply and the tail water respectively, the supply water float being guided between two walls furnished with lock gates. The axis of the water wheel and the fulcrum of the gate are arranged in the same vertical plane, and the fulcrum of the gate is automatically adjusted in accordance with the level of the tail water. Between the top edge of the gate, and the lowest part of the wheel periphery there is provided a cylindrically curved plate which is brought up close to the lowest floats of the wheel. The lower edge of the gate is provided with running rollers which are guided upon rails arranged upon the floor of the water channel, said rails being curved outwardly both at the front and the rear end. The space between the rails is closed by a similarly curved plate, which may be provided with discharge passages for removing the slime or other foreign matter accumulated upon the plate.

The drawings illustrate by way of example one construction according to the invention:

Figs. 3 and 4 are vertical sections on line $a—b$ of Fig. 1;

Fig. 5 is a fragmentary top view of the gate;

Fig. 6 shows the gate in its vertical position, and

Fig. 7 is a diagram of forces.

Figure 1:
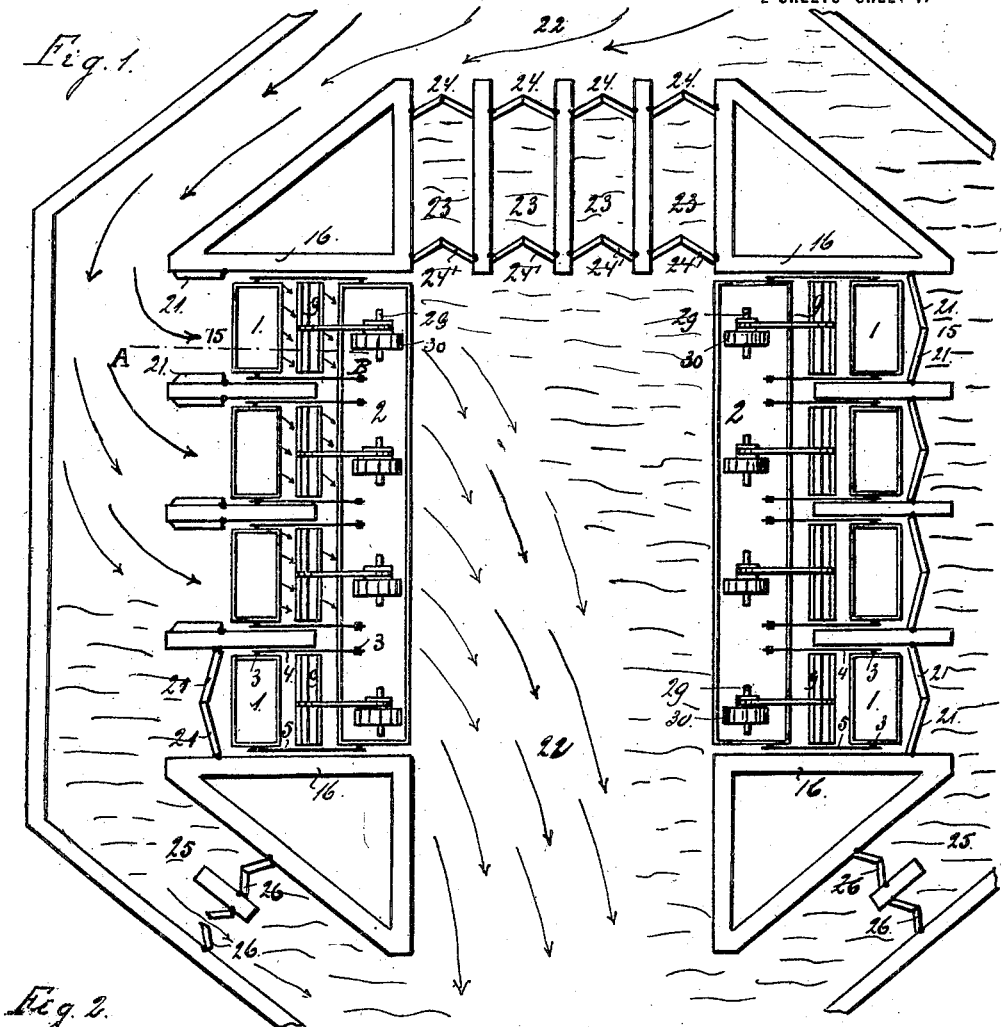
Figure 1 is a top view showing the general arrangement of parts.
Figure 2:
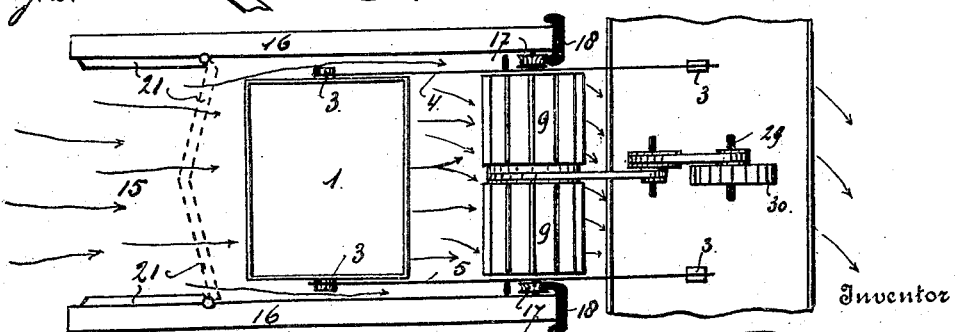
Fig. 2 is a top view of one section of the plant drawn to a larger scale.

The arrangement comprises a supply water float 1 and a tail water float 2, the former of which is placed between parallel walls 16 of the channels 15 and is guided by means of rollers 17 upon vertical rails 18. The floats 1 and 2 are connected by a frame 4 and 5 which is pivoted on horizontal axles 3 mounted upon the floats. The frame 4, 5 serves as a support for the wheel shaft 8 of the water wheel 9 and also as a support of the axle 10 upon which the gate 11 is adapted to swing. The shaft 8 and the axle 10 are arranged in a vertical line above one another, and the upper end of the gate is brought up as close as possible to the lowest point of the periphery of the wheel or the lowest blade. The gate is guided at its lower end by means of rollers 12 upon two side rails 13 which are curved upward both in the forward and in the rearward direction. The lower end or edge of the gate lies close to the curved bottom 14 which corresponds in shape to the rails 13 and forms the base of the channel 15. For the purpose of discharging mud small passages 28 may be provided in the bottom 14 which leads from the bottom surface to the tail water side. The tail water float 2 carries the transmission shaft 29, the working machines 30 and other parts.

Between the two sides 4 and 5 of the frame is arranged a segmental plate 20 extending between the upper edge of the gate and the blades 19. This plate is brought up close to the lowest blades of the wheel and lies with its lowest surface in close proximity to the edge of the gate so that the lower blades 19 of the wheel are always exposed to the full pressure of the supply water when the locking gates 21 of the individual channel in question are open.

The water in the river 22 is raised to the desired supply level by means of gates 24 arranged between parallel walls 23 built into the river. In order to enable navigation to take place several locks may be provided as indicated in the drawing, each being furnished with two pairs of doors 24, $24^1$. The water raised by these locks is led to the water wheels through branch canals and passed between one or more pairs of walls 16. The supply water float 1 mounted between a pair of these walls 16 is guided in the vertical direction and adjusts itself automatically to the supply water level. The supply water level may be regulated and kept at a constant height by means of an overflow canal 25 which may be provided with the necessary locking doors 26. In order to be able to work any desired number of wheels independently the channels 15 leading to each wheel may be provided with locking doors 21. The quantity of water discharged through an individual channel 15 passes over the gate 11 and is regulated in such a manner as to keep the capacity of each water wheel 9 as constant as possible. This is attained by adjusting the vertical position of the water wheel shaft 8 and the axle 10 of the gate in accordance with the level of the tail water by means of the supply-water float 1. The axle 10 of the gate is guided by the rollers 17 along the rails 18 so that the gate is automatically adjusted. The position of the curved plate 20 should be gradually fixed in regard to the water level below the locks in such a way that the edge of the plate 20 and said level will be approximately in line, so as to reduce to a minimum the pressure of the water below the locks upon the back face of the blades of the water wheel 9; otherwise the adjustment will take place with a shock.

The pressure upon the front surface of the gate 11 is due:

(1) to the head of the supply water above the gate 11;

(2) to the pressure of the water flowing from the gate and impinging upon the blades 19 and (3) to frictional resistances.

In order to balance partly this pressure the bottom 14 and the guide rails 13 are curved gradually upwardly both forward and backward, starting from the position in which the gate is inclined at 45°.

If the level of the water is such as to cause the float 1 to descend the wheel shaft 8 will also descend and likewise if the level of the water is such as to cause the float 1 to ascend the wheel shaft will also ascend. The pressure upon the gate 11 depends upon the position of said gate relatively to the water level and increases or diminishes as the angle between the gate and the level of the water above the locks becomes smaller or larger than 45°. This variation in the pressure upon the gate has a detrimental influence upon the adjustment of the wheel shaft 8, which increases with the size of the gate 11.

If the pressure upon the gate be called P and $\alpha$ be the angle between the gate and the tail water level, the pressure upon the axle 10 and the gate is $$X = \frac{P(\cos \alpha - \sin \alpha)}{2},$$

if $\alpha = 45°$, $X = 0$.

Fig. 7 shows a diagram of forces and for the sake of explanation the force P is substituted by two forces $\frac{1}{2}$ P, acting upon the upper and lower end of the gate respectively. If these forces $\frac{1}{2}$ P are resolved into the horizontal components $$m = \frac{P \sin \alpha}{2}$$

and the vertical components $$n = \frac{P \cos \alpha}{2};$$

it will be seen that the horizontal component $m$ acting upon the upper edge is taken up by the rails 18 while the vertical component $n$ acting upon the lower edge is taken up by the rails 13 so that there remain the following forces tending to move the gate $$m = \frac{P \sin \alpha}{2}$$

and $$n = \frac{P \cos \alpha}{2}.$$

The resulting power of the forces $n$ and $m$ acting upon the upper edge of the gate is equal to $P/2 (\cos \alpha - \sin \alpha)$ and that acting upon the edge of the gate is equal to $P/2 (\sin \alpha - \cos \alpha)$. According as $\alpha$ is greater or less than 45°, these forces will be positive or negative. These upwardly or downwardly directed forces should be balanced as far as possible in order to enable the upper edge of the gate to be maintained as accurately as possible at the height of the tail water level. This is attained by making the resistance acting upon the lower edge of the gate such as to cause the gate to be moved from its position of unstable equilibrium by the falling or rising of the supply water level, the force $n$ acting upon the upper edge of the gate 11 being balanced by this resistance. This resistance, the force $n$ should, as far as possible, be always equal to zero.

By the curved form of the guide rails 13 the gate pressure upon the supply water float 1 is balanced and neutralized up to a certain degree of accuracy. As, however, the frictional resistances of the moving part of the float and the gate are due to different causes and vary constantly, it is desirable not to transmit these resistances upon the supply water float 1 but to transmit them upon the tail water float 2, which is effected by the frame 4 and 5. Further balancing an adjustment of the vertical position of the wheel shaft 8 above the gate axle 10 may be effected by admitting or discharging ballast water of the float.

The pressure P is then horizontal. For utilizing tidal movement of the water locks or sluices may be built into the river and into the overflow canal both up and down stream. At points where the lock gates are open, the stop gates must be closed.

Having now particularly described and ascertained the nature of my said invention and in what manner the same is to be performed, I declare that what I claim is:

1. An apparatus for utilizing the water power of streaming water having a small drop, comprising an undershot water wheel, a pivoted gate arranged underneath the water wheel, a water float arranged in a supply channel, a tail water float; a frame carrying the wheel and pivoted to said floats; the upper edge of the gate being arranged in close proximity to the lowest point of the periphery of the water wheel; and means to guide the lower edge of the gate along the bottom of the supply channel.

2. An apparatus for utilizing the water power of streaming water having a small drop, comprising an undershot water wheel; a pivoted gate arranged underneath the water wheel; a water float arranged in a supply channel provided with locking doors; a tail water float; a frame carrying the wheel and pivoted to said floats; a segmental plate embracing the lowest wheel blades and attached between said blades and the upper edge of the gate; and means to guide the lower edge of the gate along the bottom of the supply channel.

3. An apparatus for utilizing the water power of streaming water having a small drop, comprising an undershot water wheel; a pivoted gate arranged underneath the water wheel; a water float arranged in a supply channel provided with locking doors; a tail water float; a frame carrying the wheel and pivoted to said floats; a segmental plate embracing the lowest wheel blades and attached between said blades and the upper edge of the gate; and means to guide the lower edge of the gate along the bottom of the supply channel.

4. An apparatus for utilizing the water power of streaming water having a small drop, comprising an undershot water wheel; a pivoted gate arranged underneath the water wheel; a water float arranged in a supply channel; a tail water float; a frame carrying the wheel and pivoted to said floats; the upper edge of the gate being arranged in close proximity to the lowest point of the periphery of the water wheel; and means to guide the lower edge of the gate along the bottom of the supply channel, said means being gradually curved upward both in the forward and in the rearward direction, commencing from the point at which the gate stands at an angle of 45°.

5. A hydraulic power plant comprising, in combination, an upstream-float; a downstream float; a water wheel supported by and between said floats and adapted to be maintained thereby in constant effective relation to the water level of the stream; and means disposed between said water wheel and the bottom of the stream adapted to compensate for the rise and fall of said stream.

6. A hydraulic power plant comprising, in combination, an undershot water wheel; a float arranged in a supply channel; a tail water float; a frame pivoted to said floats adapted to support said water wheel between said floats; doors for the water supply channel; a pivoted gate arranged underneath the water wheel, the upper edge of said gate being arranged in close proximity to the lowest point of the periphery of the water wheel, and means to guide the lower edge of said gate along the bottom of the supply channel.

7. A hydraulic power plant comprising, in combination, an upstream-float; a downstream float; a water wheel supported by and between said floats and adapted to be maintained thereby in a constant effective relation to the water level of the stream; a gate pivoted at its upper edge adjacent to the lowest point in the periphery of said water wheel; means to guide the lower edge of said gate along the bottom of the water supply channel; and means vertically to guide the pivotal axis of said gate during the rise and fall of said floats with the level of the stream.

8. An apparatus of the character described comprising, in combination, a water wheel, means to maintain said water wheel in constant effective relation to the water of the stream, and means extending from said wheel to the bottom of the stream adapted to compensate for variations in the depth of the water in said stream.

9. An apparatus of the character described comprising, in combination, a water wheel, means to maintain said water wheel in constant effective relation to the water of the stream, means including a pivotal gate extending from said wheel to the bottom of the stream to direct the water thereof against the said wheel, and guiding means for the lower end of said gate to allow said gate automatically to change its angular positions during the rise and fall of the water.

10. An apparatus of the character described comprising, in combination, a water wheel, means to maintain said water wheel in constant effective relation to the water of the stream, means vertically to guide the axis of said wheel during the rise and fall of the stream, and means disposed between said wheel and the bottom of the stream to guide the water below said wheel into engagement therewith and to compensate for variations in the depth of the stream.

In testimony whereof I affix my signature.

P. TEN BRUGGEN CATE.